US007835555B2

(12) United States Patent
Kiraly et al.

(10) Patent No.: US 7,835,555 B2
(45) Date of Patent: Nov. 16, 2010

(54) SYSTEM AND METHOD FOR AIRWAY DETECTION

(75) Inventors: Atilla Peter Kiraly, Plainsboro, NJ (US); Benjamin Odry, West New York, NJ (US); Bjoern E Coenen, Munich (DE); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1024 days.

(21) Appl. No.: 11/563,265

(22) Filed: Nov. 27, 2006

(65) Prior Publication Data

US 2007/0121787 A1 May 31, 2007

Related U.S. Application Data

(60) Provisional application No. 60/740,416, filed on Nov. 29, 2005.

(51) Int. Cl.
*G06K 9/00* (2006.01)
(52) U.S. Cl. ............... 382/128; 382/131; 382/132; 382/154; 382/260
(58) Field of Classification Search ............. 382/128, 382/131, 132, 154, 260
See application file for complete search history.

(56) References Cited

U.S. PATENT DOCUMENTS 7,116,810 B2   10/2006   Miller et al.

2005/0152591 A1   7/2005   Kiraly et al.
2005/0207630 A1   9/2005   Chan et al.
2006/0056691 A1   3/2006   Vaz et al.
2006/0159328 A1   7/2006   Vaz et al.
2006/0159360 A1   7/2006   Vaz et al.

OTHER PUBLICATIONS

Kiraly, A.P. et al., "three-Dimensional Human Airway Segmentation Methods for Clinical virtual Bronchoscoy," Academic Radiology, (2002) 9:10 pp. 1153-1168.
Bartz, D. et al., "Hybrid Segmentation and Exploration of the Human Lungs," IEEE Visualization (2003).
Aykac, D. et al., "Segmentation and Analysis of the Human Airway Tree From Three-Dimensional X-Ray CT Images," IEEE Trans. Medical Imagign (2003) 22:8 pp. 940-950.
Fetita, C.I. et al., "Pulmonary Airways: 3-D Reconstruction From Multislice CT and Clinical Investigation" IEEE Trans. Medical Imaging, 23(11), Nov. 2004.
Kiraly, A.P. et al., "Virtual Bronchoscopy for Quantitative Airway Analysis", SPIE Conf. on Medical Imaging, vol. 5746, 2006, pp. 369-383.
Li, K. et al., "Efficient Optimal Surface Detection: Theory, Implementation and Experimental Validation", SPIE conf. on Med. Imaging, vol. 5370, Feb. 2004.

(Continued)

*Primary Examiner*—John B Strege

(57) ABSTRACT

A method and system for detecting airways in 3D lung image data is disclosed. The 3D lung image data is filtered using one or more filters based on first and second order derivatives of the CT image data. Each filter calculates a value for each voxel of the 3D lung image data, and the values from all of the filters are combined to determine a voxel score for each voxel. If the voxel score for a voxel is greater than or equal to a threshold value, the voxel is considered an airway candidate.

28 Claims, 3 Drawing Sheets

OTHER PUBLICATIONS

Odry, B. et al. "Automated Airway Evaluation System for Multi-Slice Computed Tomography Using Airway Lumen Diameter, Airway Wall Thickness and Broncho-Arterial Ratio" SPIE2005.

Yoshida, H. et al., Three-Dimensional Computer-Aided Diagnosis Scheme for Detection of Colonic Polyps, IEEE Trans. Medical Imaging 2001; 20:1261-1274.

Li, Q. et al., "Selective Enhancement Filters for Nodules, Vessels, and Airway Walls in Two- and Three-Dimensional CT Scans", Med. Phys. 30(8), pp. 2040-2051, Aug. 2003.

Brejl, M. et al., "Directional 3D Edge Detection in Anisotropic Data: Detector Design and Performance Assessment", Comp. Vision and Image Understanding, 77,84-110 (2000).

Kiraly, A.P. et al., "A Fast Method for Colon Polyp Detection in High-Resolution CT Data", CARS 2004; pp. 983-988.

SYSTEM AND METHOD FOR AIRWAY DETECTION

This application claims the benefit of U.S. Provisional Application No. 60/740,416 filed Nov. 29, 2005, the disclosure of which is herein incorporated by reference.

BACKGROUND OF THE INVENTION

The present invention relates to detecting airways in 3-dimensional medical images of the lungs, and more particularly to a system and method for detecting airways in computed tomography (CT) lung images using filters based on first and second order derivatives of the CT lung images.

Computed tomography (CT) is a medical imaging method whereby digital geometry processing is used to generate a three-dimensional image of the internal features of a patient from X-ray beams. Such CT imaging results in CT volume data which is a virtual representation of internal anatomical features of a patient. The CT volume data consists of multiple slices, or two-dimensional images, that can be combined to generate a three dimensional image, CT imaging is particularly useful because it can show several types of tissue including lung, bone, soft tissue and blood vessels, with great clarity. Accordingly, such imaging of the body can be used to diagnose problems such as cancers, cardiovascular disease, infectious disease, trauma and musculoskeletal disorders.

The respiratory system starts at the nose and mouth and continues through the airways to the lungs. The largest airway is the windpipe (trachea), which branches into two smaller airways: the left and right bronchi, which lead to the two lungs. The bronchi themselves divide many times before branching into smaller airways (bronchioles). These airways get progressively smaller as they branch out, until they are smaller than a millimeter in diameter. The airways appear as small tubular objects in CT data sets. Detection of the airways in CT image data is an important component in segmentation or quantitative analysis of the airways.

Conventional methods of determining the extent of the airways include region growing, morphological algorithms, and template matching. However, detection of the smaller airways using the conventional methods is difficult due to partial volume effects and noise. Three dimensional CT image data is made up of voxels. Each voxel has an intensity value corresponding to the density of the object. If a voxel is inside an airway, the voxel will tend to have a low intensity value representing the low-density air inside the airway. If a voxel is on an airway wall, the voxel will most likely have a higher intensity value than the inner portion of the airway. However, as the airways get smaller, single voxels can include an airway, an airway wall, and surrounding tissue. In this case, partial volume effects occur whereby the voxel combines the intensity values of the air, the airway wall, and the surrounding tissue. Thus, it is difficult to accurately detect airways and airway walls. Detection of smaller airways can also be difficult due to reconstruction artifacts and noise common in CT scanning.

BRIEF SUMMARY OF THE INVENTION

The present invention is directed to a system and method for detecting airways in 3D lung image data, such as CT lung image datasets. The present invention introduces operators that give high responses to airway walls, as well as filters based on these operators to detect the airways. These filters are based on multiple first and second order derivatives of the 3D lung image data and can be used in combination to detect airways. The present invention can be used as a basis for airway segmentation or quantitative analysis. For example, the present invention can be used to provide a more accurate boundary of a segmented airway, or to accurately re-center manual click points in semi-automatic segmentation methods.

In one embodiment of the present invention, 3D lung image data is acquired, consisting of a plurality of voxels. The 3D lung image data is filtered by one or more filters based on multiple first and second order derivatives of the 3D lung image data. Each of the one or more filters calculates a filter value for each voxel of the 3D lung image data. The filter values from all of the one or more filters are then combined for each voxel to determine a score for that voxel. If the score of a voxel is greater than or equal to a threshold value, the voxel is considered an airway candidate. It is possible that the one or more filters include a first filter for filtering the 3D lung image data based on gradients of the voxels, and a second filter for filtering the 3D lung image data based on one of curvature and vesselness of the voxels. These candidates can then be processed into a full segmentation of the airway tree.

These and other advantages of the invention will be apparent to those of ordinary skill in the art by reference to the following detailed description and the accompanying drawings.

DETAILED DESCRIPTION OF EXEMPLARY EMBODIMENTS

Figure 1:
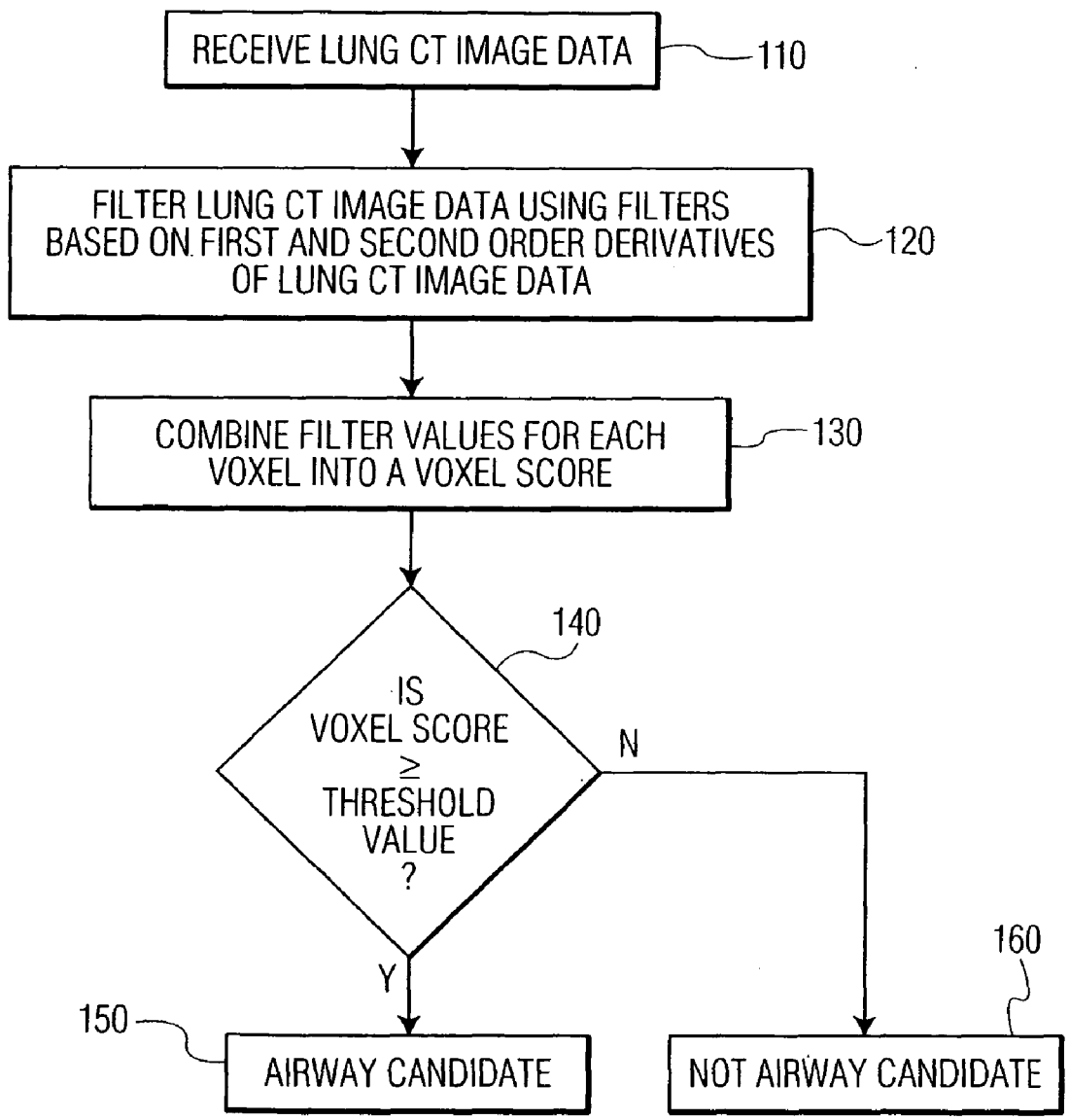
FIG. 1 illustrates a method for detecting airways in CT image data according to an embodiment of the present invention.

FIG. 1 illustrates a method for determining airway candidates in CT image data according to an embodiment of the present invention. At step 110, lung CT image data is received. The received lung CT image data represents a three dimensional image of the lungs. It is possible that the CT image data be input directly from a CT scanner. It is also possible that a previously stored CT dataset be retrieved in order to detect airways in the previously stored CT dataset. The lung CT image data is made up of a plurality of voxels, and each voxel has an intensity value corresponding to the density of the body tissue at that point.

At step 120, the lung CT image data is filtered using one or more image filters based on first and second order derivatives of the CT image data. Since airway walls contain a certain amount of curvature, different curvature filters can be used to highlight the airway wails in the CT image data. For example, one or more of the following filters can be implemented for detecting airway walls based on first and second order derivatives of the CT image data: a principal curvatures (k1, k2) filter, a Gaussian curvature (K) filter, a mean curvature (H) filter, and a vesselness (L1) filter Each of the filters provides a value for each given voxel of the CT image data based on the properties of the voxel and its neighbors. The vesselness filter detects vessel-like structures in the CT image data.

Curvature based computations or filters are based on the notion of curvature and calculated based on multiple first and second order derivatives of the CT image data or can be computed based upon local surface fitting. The principal curvatures are the minimum and maximum bending of a surface of a point. These two quantities can then be combined to form various other curvature measurements such as the Gaussian and mean curvatures for example. The vesselness filter gives emphasis to brighter tubular structures in the CT image data. This filter can be effective for detecting airway walls since locally the airway walls express vessel-like characteristics due to their curvedness. These filters operate by first computing elements of a Hessian matrix, which is based on second-order derivatives of the image at a point. Next, the sign and magnitude of the eigenvalues of the matrix are then used to produce a numerical description of the vesselness.

Since all of the above described filters require multiple first and second order derivatives of the CT image data, a scale at which the values are computed is needed. The optimal scale depends on the size of the object being examined. Due to the varying thicknesses and sizes of the airway walls, multiple scales may be necessary. However, it is possible to use a single scale if only smaller airways are targeted. This scale may be manually or automatically determined to be optimal for detecting airways in the CT image data. It is also possible to use a multi-scale approach which provides the maximal output of multiple scales.

One or more of the above described filters for detecting airway walls based on the first and second order derivatives of the CT image data can be combined with a filter for airway detection based on first order derivatives of the CT image data. For example, a magnitude-angle-radius (MARS) filter can be adapted to be combined with one or more of the above described filters. The MARS filter generates a response for a specific voxel based on the magnitude and angle of the gradient and the radius or location of the surrounding voxels. The above described airway wall filters can be used as an extension to the MARS computation to provide a lower false positive rate by emphasizing curved structures as a basis. The MARS filter is designed to provide a response in central regions of airway-like structures. The MARS filter filters each voxel of the CT volume data using the equation:

$$M(x) = \frac{\int_{\forall y \in V'} S(m, \theta, r, y) \Delta y}{T(V')}$$

where M(x) refers to the output of the MARS filter at x, a 3D location (voxel) within the image volume. y is another 3D location (voxel) in the volume. m is the magnitude of the gradient at location y, r is the radial distance from y to x, and θ is the angle between the gradient at location y and the ray from x to y. The integral proceeds over a defined volume V'. This volume can be the entire original volume V, or a defined subset V', The main function S defines how the values will be weighted at each individual point and summed within the integral. Hence, the definition of S determines specific properties of the filter. The function T provides a weighting based on the size of the given volume.

The standard MARS filter, using the above equation, only allows for gradient-based filters. However, according to an embodiment of the present invention the use of curvature or vesselness can be added as an additional feature for the filter response by combing the MARS filter with at least one of the above described airway wall filters.

Like the standard MARS filter, the proposed new filter definition also makes use of the gradients of several locations around the central voxel x. This definition can be understood as a series of rules necessary to produce a high score when x is inside an airway. It identifies all voxels with slightly larger gradient magnitudes or curvatures than the neighboring voxels and whose gradient direction generally faces the central voxel. Hence, if x is inside an airway, there will most likely be voxels with wall-like characteristics surrounding x. These tend to have greater curvature values and gradient magnitudes than the nearby surrounding region.

In addition, all regions of low gradient magnitude near the center must have low Hounsfield Unit (HU) values. HU values are well known measures of density in CT imaging. If x is inside an airway, there will be gradients due to the airway wall edges and they will point towards x. Furthermore, when x is inside an airway, the nearby voxels should have low HU values consistent with the density of air.

Finally, it is possible to find a voxel of significant gradient magnitude in the opposite direction to the original within the possible diameter of the airways being searched. If x is inside an airway, there may be a significant gradient pointing inwards due to the inner wall edge, and a corresponding gradient in the opposite direction corresponding to the outer wall edge. However, this may not be necessary in smaller airways since the risk of weakening of the airway wall due to partial volume effects may be greater, and it may be difficult to find a voxel of significant gradient magnitude in the opposite direction.

All voxels found that meet the above criteria contribute to a score, which is used to determine whether a voxel is within an airway. The score can be a floating point value associated with each voxel in the CT image dataset. Hence, the following four parameters can be used filter the voxels of a CT image dataset:

1) The magnitude of the gradient considered to be significant for the airway wall edges.
2) The allowable angle difference or penalty function for having a gradient deviating from the previously computed direction.
3) The HU level considered low enough to correspond to an airway center.
4) A diameter to search for the width of the airway walls.

Additional parameters due to the wall filters being incorporated with the MARS filter are also used to filter the CT image data. That is, parameters reflecting the curvature or vesselness of the airway walls, in addition to the above listed parameters, contribute to the score used to determine whether a voxel is in an airway. The method for computing the gradients also may have parameters based on the scale, but these are most likely constant since the focus is on small airways. These traits can be formulated into the MARS equation; however, some approximations to these rules may be necessary.

Accordingly, at step 120, each voxel of the CT image data can be filtered using multiple image filters based on first and second order derivatives of the CT image data. For example, each voxel of the CT image data can be filtered using a filter based on gradient (first order derivative), such as the MARS filter, and at least one filter based on the curvature (second order derivative), such as the first principal curvature filter. Each filter outputs a value associated with each voxel. Additionally, via the modified MARS filter previously described, a computation at a single voxel may involve additional computations at surrounding voxels.

At step 130, for each voxel in the CT image data, the values associated with that voxel output from each filter are combined into a voxel score associated with that voxel. This combination can be any function of the filters values. For a simple example, a linear weighted sum of the each individual filter output can be used to provide the final value.

At step 140, the voxel score associated with each voxel is compared to a threshold value. If a voxel score is greater than or equal to the threshold value, the associated voxel is determined to be an airway candidate at step 150. If a voxel score is less than the threshold value, the associated voxel is determined not to be an airway candidate at step 160.

Figure 2:
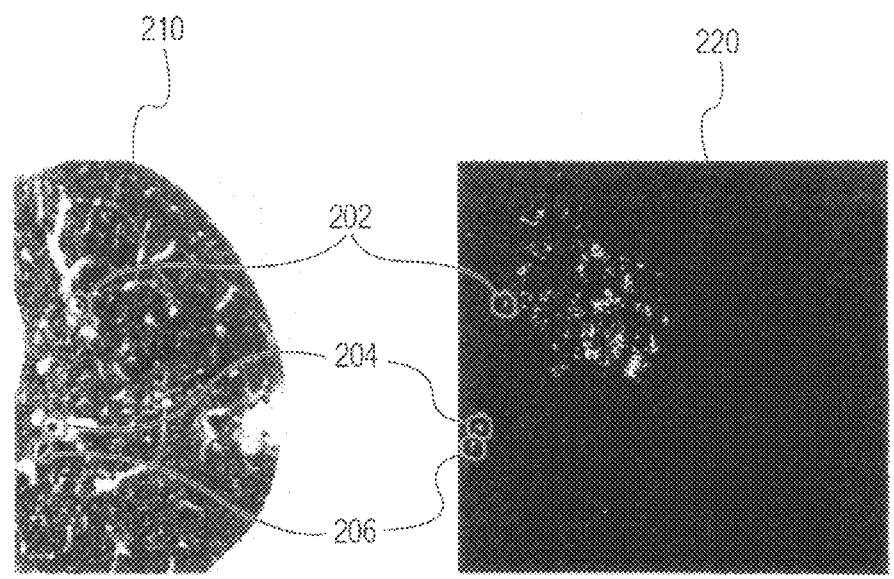
FIG. 2 illustrates airway candidates detected in an exemplary CT image.

FIG. 2 illustrates airway candidates detected in an exemplary CT image via only a MARS-based filter. Image 210 is a slice of original CT data, and image 220 shows the results of gradient based airway detection. As illustrated in FIG. 2, airways 202, 204, and 206 have been detected and are shown in images 210 and 220. Furthermore, since only the MARS-based filter is used for airway detection, many false positives are detected. The number of false positives can be reduced by combing the gradient based filter with curvature or vesselness based filters as described above.

Once airway candidates are detected, the airway candidates can be used in airway segmentation operations as well as semi-automatic methods for airway analysis. In airway segmentation, the candidates can be correlated with each other to determine true candidates from false positives. The use of the airway detection method can allow for an automatic re-centering of the manually clicked point, leading to better usability in the case of small airways. For example, in many existing semi-automatic methods that require the user to click on an airway to analyze, it can be a difficult process if the airway is small and the user clicks just outside of it. In this situation, the output results of the algorithm can go astray due to being given a location within the parenchyma or within a blood vessel.

The present invention is described herein as being applied to CT image data, but is not limited thereto. In addition to CT image data, the present invention may be applied to other types of 3-dimensional imaging modalities, such as Magnetic Resonance Imaging (MRI), Positron Emission Tomography (PET), Single Photon Emission Computed Tomography (SPECT), 3D ultrasound (US) and so forth.

Figure 3:
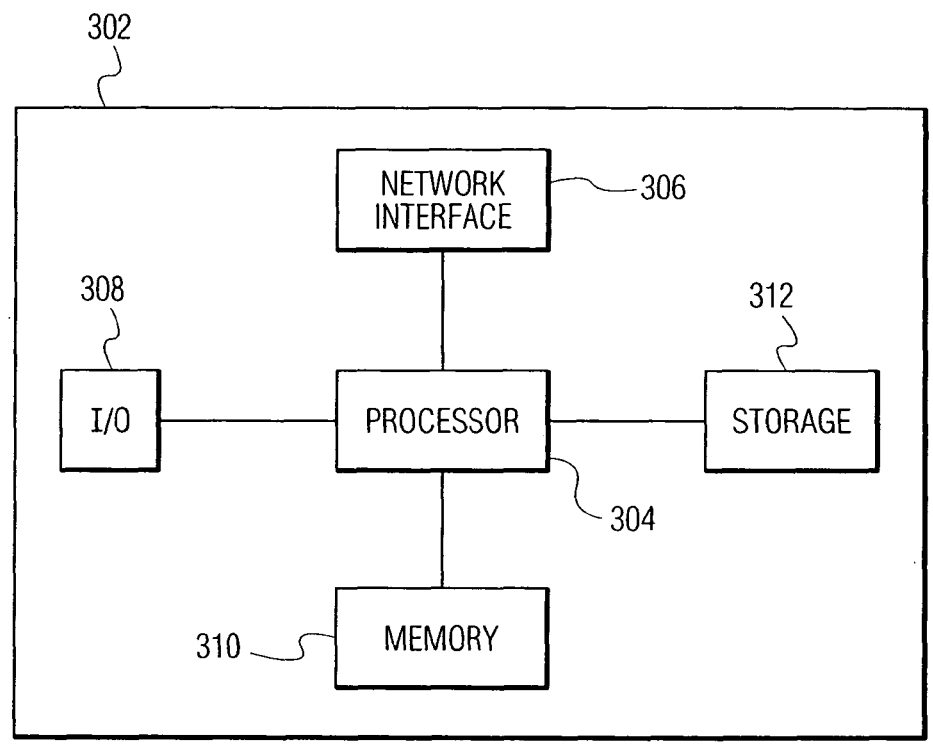
FIG. 3 illustrates a high level block diagram of a computer capable of implementing the present invention.

The airway detection method described above can be implemented on a computer using well known computer processors, memory units, storage devices, computer software, and other components. A high level block diagram of such a computer is illustrated in FIG. 3. Computer 302 contains a processor 304 which controls the overall operation of the computer 302 by executing computer program instructions which define such operation. The computer program instructions may be stored in a storage device 312 (e.g., magnetic disk) and loaded into memory 310 when execution of the computer program instructions is desired. Thus, filters to perform filtering of the CT image data can be defined by the computer program instructions stored in the memory 310 and/or storage 312 and controlled by the processor 304 executing the computer program instructions. Furthermore, the CT image data as well as the airway detection results can also be stored in the memory 310 and/or the storage. The computer 302 also includes one or more network interfaces 306 for communicating with other devices via a network. The computer 302 also includes input/output 308 which represents devices which allow for user interaction with the computer 302 (e.g., display, keyboard, mouse, speakers, buttons, etc.) One skilled in the art will recognize that an implementation of an actual computer will contain other components as well, and that FIG. 3 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for detecting airways in 3-dimensional image data, comprising:
    receiving 3D lung image data;
    filtering, by a processor, the 3D lung image data using one or more filters based on multiple first and second order derivatives of the 3D lung image data; and
    detecting, by a processor, airways in the 3D lung image data based on the filtered 3D lung image data, wherein the 3D lung image data comprises a plurality of voxels, and said step of filtering the 3D lung image data comprises:
        calculating a gradient at each voxel of said plurality of voxels;
        filtering each voxel of the 3D lung image data using a first filter based on the gradient calculated at each voxel to calculate a first filter value for each voxel;
        calculating a curvature measure at each voxel of said plurality of voxels;
        filtering each voxel of the 3D lung image data using a second filter based on the curvature calculated at each voxel to calculate a second filter value for each voxel; and
        combining the first and second filter values for each voxel to determine a voxel score associated with each voxel.

2. The method of claim 1, wherein said step of detecting airways comprises:
    comparing the voxel score associated with each voxel to a threshold value; and
    determining voxels for which the voxel score is greater than or equal to the threshold value to be airway candidates.

3. The method of claim 1, wherein said first filter comprises a magnitude-angle-radius (MARS) filter.

4. The method of claim 1, wherein said second filter is based on principal curvatures.

5. The method of claim 1, wherein the 3D lung image data is acquired from Computed Tomography (CT) imaging.

6. A method for detecting airways in 3-dimensional image data, comprising:
    receiving 3D lung image data;
    filtering, by a processor, the 3D lung image data using one or more filters based on multiple first and second order derivatives of the 3D lung image data; and
    detecting, by a processor, airways in the 3D lung image data based on the filtered 3D lung image data, wherein the 3D lung image data comprises a plurality of voxels, and said step of filtering the 3D lung image data comprises:
        calculating a gradient at each voxel of said plurality of voxels;
        filtering each voxel of the 3D lung image data using a first filter based on the gradient calculated at each voxel to calculate a first filter value for each voxel;
        calculating vesselness at each voxel of said plurality of voxels;

filtering each voxel of the 3D lung image data using a second filter based on the vesselness calculated at each voxel to calculate a second filter value for each voxel; and combining the first and second filter values for each voxel to determine a voxel score associated with each voxel.

7. The method of claim 6, wherein said step of detecting airways comprises:

comparing the voxel score associated with each voxel to a threshold value; and determining voxels for which the voxel score is greater than or equal to the threshold value to be airway candidates.

8. The method of claim 6, wherein said first filter comprises a magnitude-angle-radius (MARS) filter.

9. The method of claim 6, wherein the 3D lung image data is acquired from Computed Tomography (CT) imaging.

10. A method for detecting airways in 3-dimensional image data, comprising:

receiving 3D lung image data;

filtering, by a processor, the 3D lung image data using one or more filters based on multiple first and second order derivatives of the 3D lung image data; and detecting, by a processor, airways in the 3D lung image data based on the filtered 3D lung image data, wherein the 3D lung image data comprises a plurality of voxels, and said step of filtering the 3D lung image data comprises:

determining a filter value using an airway filter based on the first order derivative of the 3D lung image data in the vicinity of each voxel and an airway wall filter based on the first and second order derivatives of the 3D lung image data in the vicinity of each voxel.

11. The method of claim 10, wherein the 3D lung image data is acquired from Computed Tomography (CT) imaging.

12. An apparatus for detecting airways in 3D lung image data, comprising:

means for filtering the 3D lung image data using one or more filters based on multiple first and second order derivatives of the 3D lung image data; and means for detecting airways in the 3D lung image data based on the filtered 3D lung image data, wherein the 3D lung image data comprises a plurality of voxels, and said means for filtering the 3D lung image data comprises:

means for calculating a gradient at each voxel of said plurality of voxels;

a first filter for filtering each voxel of the 3D lung image data based on the gradient calculated at each voxel to calculate a first filter value for each voxel;

means for calculating a curvature measure at each voxel of said plurality of voxels;

a second filter for filtering each voxel the 3D lung image data based on the curvature calculated at each voxel to calculate a second filter value for each voxel; and means for combining the first and second filter values for each voxel to determine a voxel score associated with each voxel.

13. The apparatus of claim 12, wherein said first filter comprises a magnitude-angle-radius (MARS) filter.

14. The apparatus of claim 12, wherein said second filter filters each voxel based on computed principal curvatures.

15. The apparatus of claim 12, wherein the 3D lung image data is acquired from Computed Tomography (CT) imaging.

16. An apparatus for detecting airways in 3D lung image data, comprising:

means for filtering the 3D lung image data using one or more filters based on multiple first and second order derivatives of the 3D lung image data; and means for detecting airways in the 3D lung image data based on the filtered 3D lung image data, wherein the 3D lung image data comprises a plurality of voxels, and said means for filtering the 3D lung image data comprises:

means for calculating a gradient at each voxel of said plurality of voxels;

a first filter for filtering each voxel of the 3D lung image data based on the gradient calculated at each voxel to calculate a first filter value for each voxel;

means for calculating vesselness at each voxel of said plurality of voxels;

a second filter for filtering each voxel the 3D lung image data based on the vesselness calculated at each voxel to calculate a second filter value for each voxel; and means for combining the first and second filter values for each voxel to determine a voxel score associated with each voxel.

17. The apparatus of claim 16, wherein said first filter comprises a magnitude-angle-radius (MARS) filter.

18. The apparatus of claim 16, wherein the 3D lung image data is acquired from Computed Tomography (CT) imaging.

19. An apparatus for detecting airways in 3D lung image data, comprising:

means for filtering the 3D lung image data using one or more filters based on multiple first and second order derivatives of the 3D lung image data; and means for detecting airways in the 3D lung image data based on the filtered 3D lung image data, wherein the 3D lung image data comprises a plurality of voxels, and said means for filtering the 3D lung image data comprises:

an airway filter to determine a first filter value for each voxel based on the first order derivative of the 3D lung image data in the vicinity of each voxel;

an airway wall filter to determine a second filter value for each voxel based on the second order derivative of the 3D lung image data in the vicinity of each voxel.

20. The apparatus of claim 19, wherein the 3D lung image data is acquired from Computed Tomography (CT) imaging.

21. A non-transitory computer readable medium storing computer program instructions for detecting airways in 3D lung image data, said computer program instructions defining the steps comprising:

filtering the 3D lung image data based on multiple first and second order derivatives of the 3D lung image data; and detecting airways in the 3D lung image data based on the filtered 3D lung image data, wherein the 3D lung image data comprises a plurality of voxels, and the computer program instructions defining the step of filtering the 3D lung image data comprise computer program instructions defining the steps of:

calculating a gradient at each voxel of said plurality of voxels;

filtering each voxel of the 3D lung image data based on the gradient calculated at each voxel to calculate a first filter value for each voxel;

calculating a curvature measure at each voxel of said plurality of voxels;

filtering each voxel the 3D lung image data based on the curvature calculated at each voxel to calculate a second filter value for each voxel; and combining the first and second filter values for each voxel to determine a voxel score associated with each voxel.

22. The non-transitory computer readable medium of claim 21, wherein the computer program instructions defining the step of detecting airways comprise computer program instructions defining the step of:

comparing the voxel score associated with each voxel to a threshold value; and determining voxels for which the voxel score is greater than or equal to the threshold value to be airway candidates.

23. The non-transitory computer readable medium of claim 21, wherein the 3D lung image data is acquired by Computed Tomography (CT) imaging.

24. A non-transitory computer readable medium storing computer program instructions for detecting airways in 3D lung image data, said computer program instructions defining the steps comprising:

filtering the 3D lung image data based on multiple first and second order derivatives of the 3D lung image data; and detecting airways in the 3D lung image data based on the filtered 3D lung image data, wherein the 3D lung image data comprises a plurality of voxels, and the computer program instructions defining the step of filtering the 3D lung image data comprise computer program instructions defining the steps of:

calculating a gradient at each voxel of said plurality of voxels;

filtering each voxel of the 3D lung image data based on the gradient calculated at each voxel to calculate a first filter value for each voxel;

calculating vesselness at each voxel of said plurality of voxels;

filtering each voxel the 3D lung image data based on the vesselness calculated at each voxel to calculate a second filter value for each voxel; and combining the first and second filter values for each voxel to determine a voxel score associated with each voxel.

25. The non-transitory computer readable medium of claim 24, wherein the computer program instructions defining the step of detecting airways comprise computer program instructions defining the step of:

comparing the voxel score associated with each voxel to a threshold value; and determining voxels for which the voxel score is greater than or equal to the threshold value to be airway candidates.

26. The non-transitory computer readable medium of claim 24, wherein the 3D lung image data is acquired by Computed Tomography (CT) imaging.

27. A non-transitory computer readable medium storing computer program instructions for detecting airways in 3D lung image data, said computer program instructions defining the steps comprising:

filtering the 3D lung image data based on multiple first and second order derivatives of the 3D lung image data; and detecting airways in the 3D lung image data based on the filtered 3D lung image data, wherein the 3D lung image data comprises a plurality of voxels, and the computer program instructions defining the step of filtering the 3D lung image data comprise computer program instructions defining the step of:

determining a filter value using an airway filter based on the first order derivative of the 3D lung image data in the vicinity of each voxel and an airway wall filter based on the first and second order derivatives of the 3D lung image data in the vicinity of each voxel.

28. The non-transitory computer readable medium of claim 27, wherein the 3D lung image data is acquired by Computed Tomography (CT) imaging.

* * * * *